United States Patent [19]
Komaki et al.

[11] Patent Number: 5,195,080
[45] Date of Patent: Mar. 16, 1993

[54] OPTICAL RECORDING MEDIUM INITIALIZING METHOD AND APPARATUS

[75] Inventors: Toshihiro Komaki; Masahiro Katsumura, both of Saitama, Japan

[73] Assignee: Pioneer Electronic Corporation, Tokyo, Japan

[21] Appl. No.: 779,860

[22] Filed: Oct. 21, 1991

[30] Foreign Application Priority Data

Mar. 1, 1991 [JP] Japan ................................ 3-36191

[51] Int. Cl.$^5$ ............................................. G11B 7/00
[52] U.S. Cl. .................................. 369/100; 369/275.2; 360/66
[58] Field of Search ................. 369/124, 275.2, 100; 365/218; 360/66

[56] References Cited

U.S. PATENT DOCUMENTS

| | | | |
|---|---|---|---|
| 4,405,993 | 9/1983 | Kahn et al. | 369/275.2 |
| 4,970,711 | 11/1990 | Martin et al. | 369/100 |
| 5,056,081 | 10/1991 | Hsieh | 369/275.2 |

FOREIGN PATENT DOCUMENTS

| | | |
|---|---|---|
| 0244005 | 11/1987 | European Pat. Off. |
| 0301865 | 2/1989 | European Pat. Off. |
| 0339875 | 11/1989 | European Pat. Off. |

*Primary Examiner*—Jack I. Berman
*Attorney, Agent, or Firm*—Sughrue, Mion, Zinn, Macpeak & Seas

[57] ABSTRACT

An optical recording medium initializing apparatus is disclosed in which an initializing light beam having a Gaussian distribution is applied to an optical recording medium. The optical energy thus applied to the medium is uniform in distribution, thus resulting in the satisfactory initialization of the recording medium.

6 Claims, 4 Drawing Sheets

OPTICAL RECORDING MEDIUM INITIALIZING METHOD AND APPARATUS

BACKGROUND OF THE INVENTION

1. Technical Field

This invention relates to an optical recording medium initializing method and apparatus for initializing a rewritable recording medium by applying a light beam to the medium.

2. Background Art

Recently, rewritable recording media such as phase change type optical disks and magneto-optical disks have been employed in the art. Such recording media must be initialized when shipped to market. For this purpose, manufacturers of such recording media are provided with an optical recording medium initializing apparatus.

A conventional initializing apparatus is shown in FIG. 3(a). In the apparatus, a recording mechanism 1 is set on a turntable 2, which is rotated by a rotating mechanism such as a spindle motor 3. The spindle motor 3 is mounted on a bearing mechanism such as feed stage 4. The feed stage 4 is penetrated by the output shaft 6 of a conveying mechanism such as conveying motor 5. More specifically, the shaft 6 has a threaded portion 6a, which is engaged with a threaded portion (not shown) of the feed stage 4. The feed stage 4 is movably engaged with rails (not shown) on a supporting stand 7.

A conveying signal forming unit, such as a DC source 8, applies a conveying signal E to the conveying motor 5 to rotate the latter at a constant speed. As the conveying motor 5 rotates, that is, as the shaft 6 rotates, the feed stage 4 is moved in parallel with the shaft 6, or in the direction of the arrow X, at a constant speed due to the engagement of shaft 6 with the feed stage 4.

An irradiating mechanism, such as an optical unit 10, applies an initializing light beam 9 to the disk 1. The light beam 9 is moved in the direction opposite to the direction of the arrow X as the feed stage 4 is moved in the direction of the arrow X. Thus, the light beam 9 is moved relative to the disk 1. More specifically, the beam spot S of the light beam applied to the disk 1 is moved radially outwardly of the disk 1 along the axis A-B (as shown in FIG. 3(b), while the disk 1 continues to rotate. As a result, the beam spot S is moved in one direction in parallel with the shaft, and the whole surface of the disk can be initialized.

In order to shorten a period of time required for the initializing operation, the lens 10a of the optical unit 10 employs a lens 10a having a small numerical aperture (NA); that is, the beam spot of the light beam is made relatively large in diameter, about 20 μm. Information recording track guides, such as pre-grooves, are provided on the disk 1. As shown in FIG. 4, the beam spot S is applied to a wide range of surface area including a number of pre-grooves. If the lens 10a is a cylindrical lens, the resultant beam spot S takes the form of an ellipse elongated in the direction X as shown in FIG. 5. Thus, the utilization factor of the light beam is increased as much.

The conveying signal E supplied to the conveying motor 5 is a DC voltage as shown in FIG. 6. Therefore, the feed stage 4 can be continuously moved parallel at a constant speed. However, since the disk 1 is rotated, the positions of the beam spot S in a radial direction are not continuous, as shown in FIG. 7. More specifically, the beam spot S is applied at intervals of Δx as indicated at S1, S2, S3 and so forth every revolution of the disk 1. The distance Δx can be represented by the following equation:

$$\Delta x = 2\pi v / \omega$$

where v is the speed of movement of the feed stage 4, and ω is the angular speed of the disk 1.

The energy distribution of the light beam 9 is a Gaussian distribution and, therefore, the energy around the beam spot S is smaller than the energy at the center. Accordingly, the recording surface of the disk is not uniformly irradiated with the light beam; that is, the optical energy applied to the recording surface of the disk is not uniform in distribution as indicated in FIG. 7. Thus, it is impossible to suitably initialize the disk with the conventional initializing apparatus.

SUMMARY OF THE INVENTION

Accordingly, an object of the present invention is to provide an optical recording medium initializing apparatus with an initializing light beam having a Gaussian distribution applied to a recording medium with a uniform distribution of optical energy being applied to the recording medium to thereby initialize the recording medium.

The foregoing object of the invention can be achieved by the provision of an optical recording medium initializing apparatus comprising: rotating means for rotating an optical recording medium; bearing means which supports the rotating means; conveying signal forming means for forming a conveying signal; irradiating means for applying an initializing light beam to the optical recording medium in such a manner that the light beam traverses across the optical recording medium in parallel with the direction of movement of the bearing means, AC signal forming means for producing an AC signal; and composing means for superimposing the AC signal on the conveying signal.

In the invention, the light beam is vibrated in the direction of movement of the conveying means by applying the initializing light beam to the optical recording medium in such a manner that it goes across the optical recording medium in parallel with the direction of movement of the conveying means.

DESCRIPTION OF THE PREFERRED EMBODIMENTS

A preferred embodiment of this invention will be described below with reference to FIGS. 1 and 2.

Figure 1:
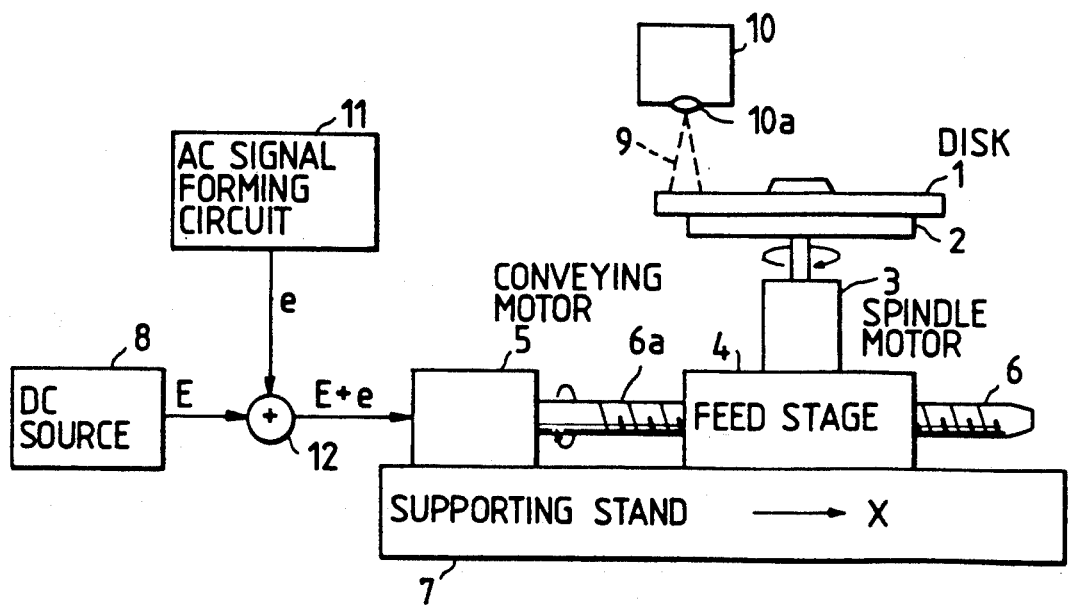
FIG. 1 is an explanatory diagram showing an optical recording medium initializing apparatus which constitutes one embodiment of the present invention.
Figure 2:
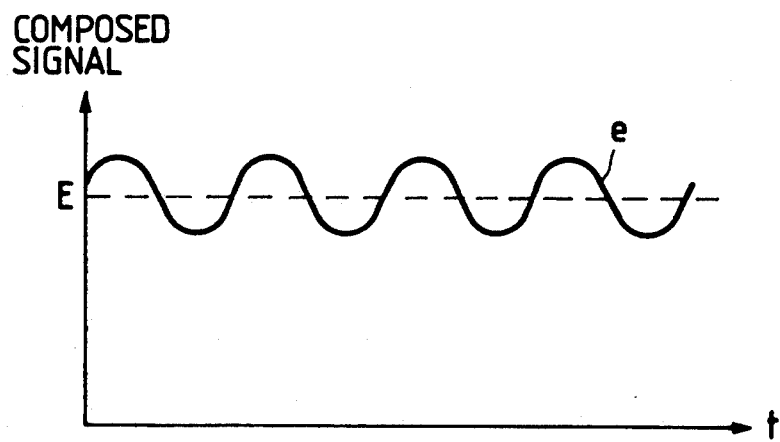
FIG. 2 is a graphical representation showing a composed signal employed in the apparatus shown in FIG. 1.
Figure 3A:
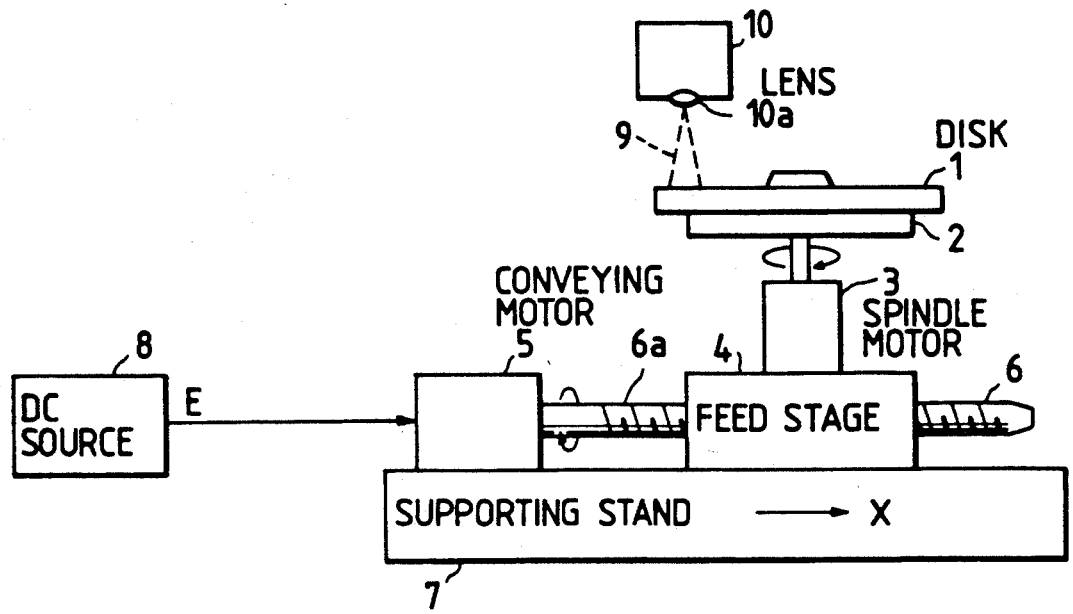
FIG. 3(a) is an explanatory diagram showing a conventional optical recording medium initializing apparatus.
Figure 3B:
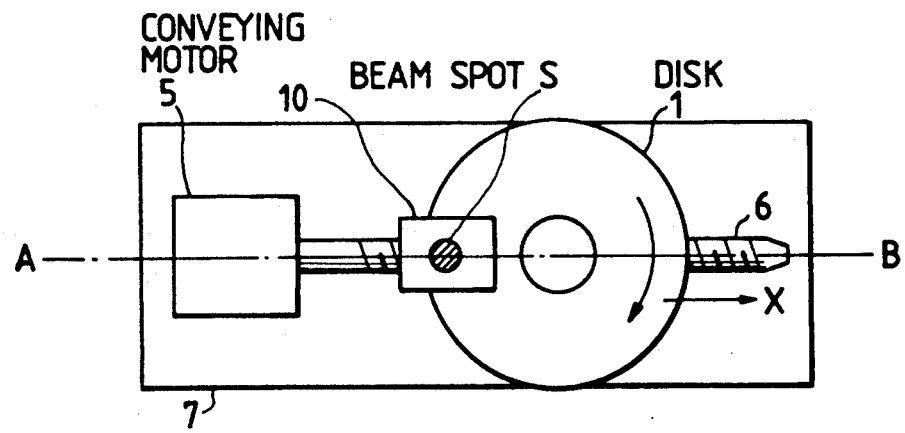
FIG. 3(b) is a plan view of the conventional optical recording medium initializing apparatus.
Figure 4:
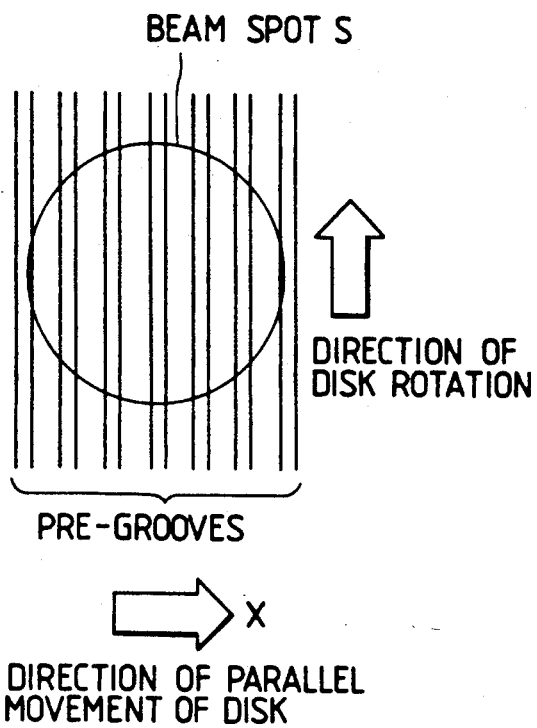
FIG. 4 is a diagram showing a beam spot on a disk 1 shown in FIGS. 3(a) and 3(b).

As shown in FIG. 1, an AC signal forming circuit 11 and a composing circuit 12 are connected between a DC source 8 and a conveying motor 5. The remaining components depicted are the same as those in the initializing apparatus described with reference to FIG. 3(a).

The AC signal forming circuit 11 applies an AC signal e of about 10 Hz to one of the input terminals of the composing circuit 12, while the DC source 8 applies a conveying signal E to the other input terminal of the composing circuit 12. In the composing circuit 12, the AC signal e is superimposed on the conveying signal E to form a control signal (E+e) as shown in FIG. 2. The control signal thus formed is applied to the conveying motor 5. The conveying motor 5 is rotated in a predetermined direction by the DC component of the control signal; however, its rotation is vibrated because of the AC component of the control signal. Hence, the feed stage 4 is moved in the direction X while being vibrated. Accordingly, the beam spot S is moved relative to the disk 1 while being vibrated. More specifically, the beam spot S is moved across the disk 1 while being vibrated. Because of the vibration of the beam spot S, the central part of the beam spot S, which is higher in optical energy, is applied to the portions of the disk 1 which are less irradiated by the beam spot shown in FIG. 7. As a result, the optical energy applied to the whole recording surface of the disk is uniform in distribution.

Figure 5:
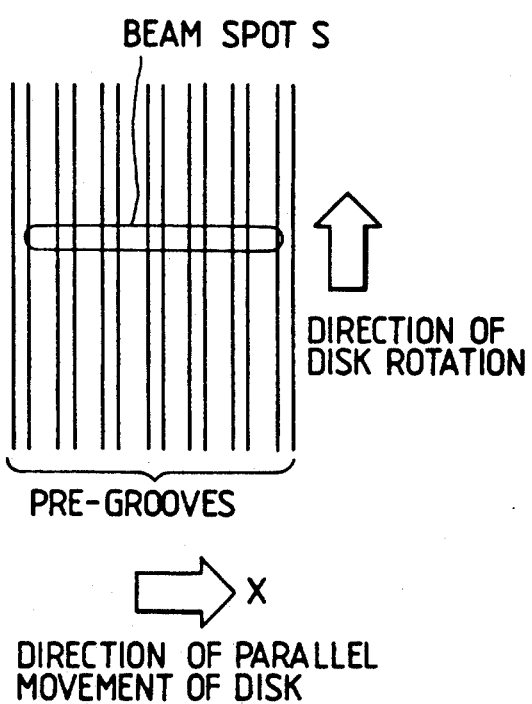
FIG. 5 is a diagram showing an elliptic beam spot on the disk 1 shown in FIGS. 3(a) and 3(b).
Figure 6:
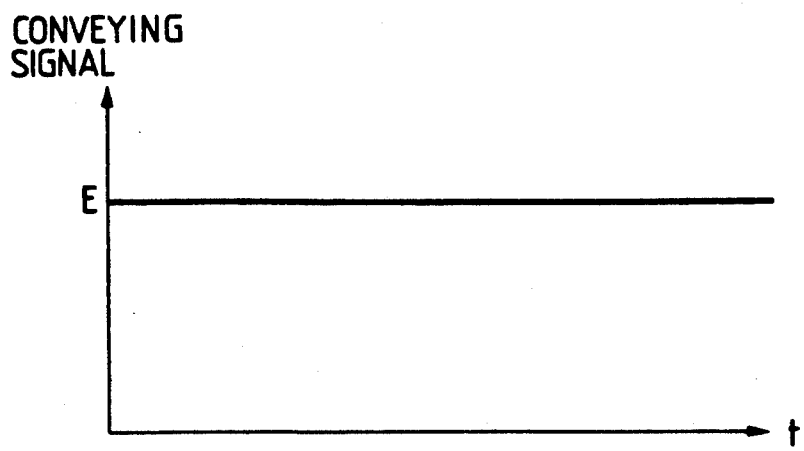
FIG. 6 is a graphical representation indicating a conveying signal employed in the conventional optical recording medium initializing apparatus shown in FIG. 3(a).

In the case where the elliptic beam spot shown in FIG. 5 is employed, the ellipticity is equivalently increased by the vibration of the beam spot; that is, the beam spot is made elliptic with the cylindrical lens more effectively, when vibrated.

Figure 7:
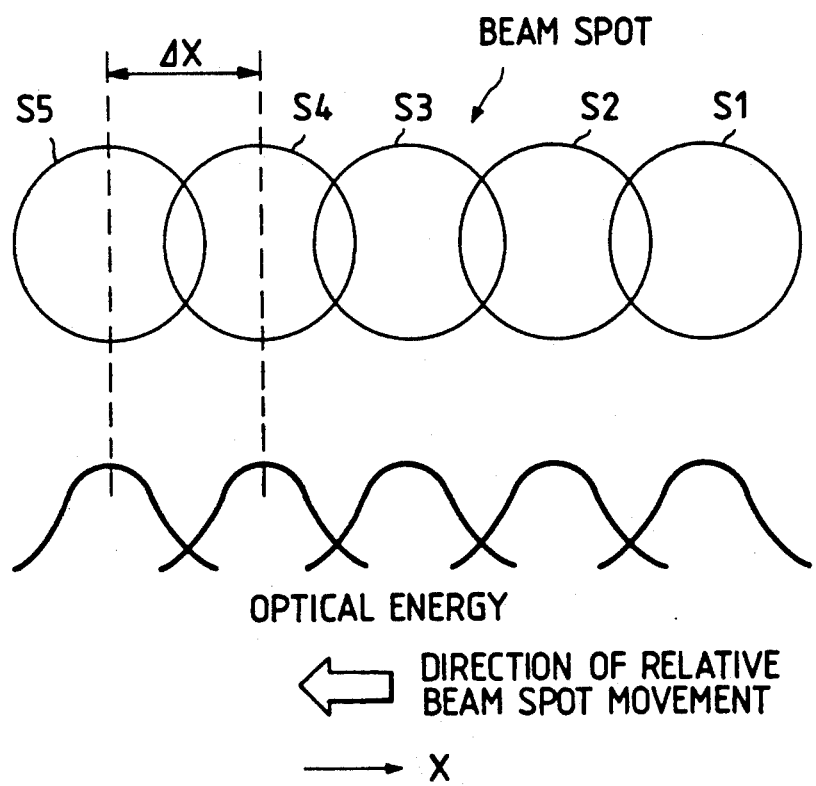
FIG. 7 is an explanatory diagram for a description of the parallel movement of a beam spot in the conventional initializing apparatus shown in FIG. 3(a).

In the above-described embodiment, the frequency of the AC signal e is set to about 10 Hz. This frequency setting is to make the frequency of vibration of the beam spot S asynchronous with the speed of rotation of the spindle motor 3, thereby eliminating the difficulty that the optical energy applied to the disk is non-uniform in distribution as shown in FIG. 7. Hence, the frequency of the AC signal e is not limited to 10 Hz only. That is, any frequency can be employed with which the frequency of vibration of the beam spot is made asynchronous with the speed of rotation of the spindle motor 3, and thus the non-uniform irradiation of the disk with the beam spot can be eliminated.

As was described above, the initializing apparatus of the present invention moves the initializing light beam across the optical recording medium, causing the initializing light beam to vibrate in the direction of movement thereof. As a result, the optical energy applied to the recording medium is uniform in distribution over the whole surface to be initialized. Thus, the resulting light beam has a Gaussian distribution, and the optical recording medium can be satisfactorily initialized.

While the invention has been described in specific detail with respect to one embodiment of the invention, it should be understood that the invention is not limited to the specifics described above. The invention should only be limited to the claims set forth below.

What is claimed is:

1. An optical recording medium initializing apparatus comprising:
   rotating means for rotating an optical recording medium;
   bearing means which supports said rotating means;
   conveying signal forming means for forming a conveying signal;
   irradiating means for applying an initializing light beam to said optical recording medium in such a manner that said light beam goes across said optical recording medium in parallel with the direction of movement of said bearing means in accordance with a control signal;
   AC signal forming means for producing an AC signal; and
   composing means for superimposing said AC signal on said conveying signal to form said control signal.

2. The optical recording medium initializing apparatus set forth in claim 1, wherein said AC signal has a frequency that corresponds with a speed of rotation of said rotating means.

3. An initializing apparatus comprising:
   an AC signal forming source;
   a conveying signal source;
   a composing circuit, forming a control signal by superimposing an AC signal output from said AC signal forming source on a conveying signal output from said conveying signal source;
   an irradiating beam source, irradiating an initializing beam on a recording medium; and
   wherein said beam traverses across said medium in accordance with said control signal.

4. The initializing apparatus set forth in claim 3, wherein said AC signal forming source outputs said AC signal at a frequency that corresponds with a speed of rotation of said medium.

5. A method of initializing a recording medium comprising the steps of:
   forming an AC signal;
   generating a conveying signal;
   producing a control signal by superimposing said AC signal on said conveying signal; and
   irradiating a beam across a surface of a rotating recording medium in accordance with said control signal.

6. The method of initializing set forth in claim 5, wherein said AC signal has a frequency that corresponds with a speed of rotation of said medium.

* * * * *